United States Patent [19]

Propster

[11] 4,332,604

[45] Jun. 1, 1982

[54] STRENGTH IMPROVEMENT OF GLASS BATCH PELLETS

[75] Inventor: Mark A. Propster, Gahanna, Ohio

[73] Assignee: Owens-Corning Fiberglas Corporation, Toledo, Ohio

[21] Appl. No.: 219,411

[22] Filed: Dec. 22, 1980

[51] Int. Cl.³ .............................................. C03B 1/00
[52] U.S. Cl. ........................................ 65/27; 501/29; 501/58
[58] Field of Search ............... 65/27; 106/54, DIG. 8; 501/29, 58

[56] References Cited

U.S. PATENT DOCUMENTS 4,074,990  2/1978  Brzozowski et al. ................... 65/27
4,235,618  11/1980  Henry et al. ............................ 65/27

Primary Examiner—Arthur D. Kellogg
Attorney, Agent, or Firm—Ronald C. Hudgens; Philip R. Cloutier

[57] ABSTRACT

The incorporation of an additive selected from the group consisting of sodium carbonate, sodium hydroxide and boric acid into a glass batch pellet comprising uncalcined colemanite imparts to the pellets improved strength when heated to 1100° F. (593° C.).

9 Claims, No Drawings

STRENGTH IMPROVEMENT OF GLASS BATCH PELLETS

BACKGROUND OF THE INVENTION

This invention relates to strength improvement of glass batch pellets.

In one of its more specific aspects, this invention relates to a process for improving the strength of glass batch pellets containing raw Turkish colemanite such that the pellets are more readily handleable, without breaking down, in subsequent processing.

The use of glass batch for the production of glass, such as glass fibers, is well known. Recent developments have indicated that definite process advantages are obtainable if the powdered glass batch is pelleted and the pellets dried and preheated prior to their introduction into the glass melter wherein the batch is melted to produce molten glass from which fibers are produced. However, for such processing, a minimum pellet strength is required in order that the pellets not break down in handling. This is particularly true as concerns the steps of drying and preheating of the pellets in which steps water of hydration can be driven from one or more components of the pellets with the result that decrepitation of the pellets can take place. Raw colemanite is one of the several materials which can undergo such dehydration.

STATEMENT OF THE INVENTION

There has now been discovered a process which contributes to the increase in the strength of pellets which contain uncalcined colemanite. The process comprises contacting the colemanite-containing glass batch with an aqueous solution comprising at least one additive selected from the group consisting of sodium carbonate, sodium hydroxide and boric acid, forming pellets from the batch, drying the pellets, introducing the pellets into a melter and melting the pellets to form molten glass which is converted into glass fibers.

In one of its more specific aspects, the uncalcined colemanite-containing pellets are contacted with one of the aforesaid additives such that the amount of the additive contained in the dried pellet is not less than about 2.5 weight percent of sodium carbonate or not less than about 4 weight percent of boric acid or of sodium hydroxide. In any instance, however, it is generally desirable to use only as much additive that upon drying, the pellet has a hot strength at about 1100° F. (593° C.) of about 4 pounds.

In the preferred embodiment of the invention, the aqueous solution used in pelletizing the particulate batch will contain the additive.

In another embodiment of the invention, the additive will be mixed in the batch and pelletized with water prior to drying.

PRIOR ART

U.S. Pat. No. 4,031,175 to Cooper teaches the use of sodium carbonate or sodium hydroxide as components of an aqueous pelletizing solution. However, the glass batch concerned therein contains no raw colemanite. It is recognized that raw colemanite, which contains water of crystallization when calcined at about 734° F. (390° C.) loses a principal portion of this water of crystallization with the result that if this water is contained in a pellet which is being calcined, the loss of that portion of the water causes the pellet to disintegrate.

U.S. Pat. No. 4,074,990 to Brzozowski teaches the pelletization of particulate batch containing colemanite with water but warns that if colemanite is used as a single source of $B_2O_3$, temperatures above 770° F. (410° C.) should be avoided during the drying step because attempts to dry these pellets above this temperature result in the disintegration of the pellets and their return to the powdery state.

The latter reference, in view of the former reference, would imply that if particulate batch of the former reference does contain colemanite as the sole source of $B_2O_3$, when in pelleted form, the pellets should not be heated above 770° F. (410° C.) because pellet disintegration takes place. This invention sets forth data showing, however, that particulate batch containing colemanite as the sole source of $B_2O_3$ when pelleted employing one of the aforementioned pelleting solution additives, can be heated above 770° F. (410° C.) and attains an increase in strength even when heated above that temperature.

The method of this invention is illustrated by the following examples in which a standard glass batch comprising about 30.1 weight percent silicon dioxide, 24.9 weight percent limestone, 29.5 weight percent clay, 0.8 weight percent sodium silicofluoride and 14.7 weight percent uncalcined Turkish colemanite was used as the particulate material. All pelletizing was carried out in an inclined, rotating disc pelletizer using an aqueous solution of the additive.

In each instance, the concentration of the solution containing the additive was adjusted to give the desired concentration of the additive in the pellet. For example, assuming that the wet pellets will contain about 20 weight percent water and 200 pounds of particulate matter is to be pelletized and the required concentration of the additive in the pellet is 2 percent by weight, the amount of additive which will be incorporated in the pelletizing solution will be 40 pounds.

In each instance, the batch having the aforementioned composition was pelletized employing various concentrations of an additive in aqueous solution. The pellets were dried and their strengths were determined at 1100° F. (593° C.). In each instance, a strength of about 4 pounds, minimum, was considered adequate.

EXAMPLE I

| Additive: Sodium Carbonate | |
|---|---|
| $Na_2CO_3$ in Pellet Wgt. % | Strength of Pellet @ 1100° F., Pounds |
| 1 | 0 |
| 2 | 0 |
| 2.5 | 4.1 |
| 3 | 8.2 |
| 5.0 | 16.3 |

It will be seen that adequate pellet strength is reached when an amount of sodium carbonate of 2.5 weight percent is incorporated into the dry pellet.

EXAMPLE II

A glass batch composition comparable to that of Example I was blended with various amounts of boric acid, the composition being decreased in respect to colemanite as the amount of boric acid was increased. Strengths were determined on the dried pellets and pellets heated to 1100° F. (593° C.). Results were as follows:

| % Colemanite In Batch Weight % | % Boric Acid Weight % | % H₂O | Pellet Strengths, Pounds Dried | @ 1100° F. |
|---|---|---|---|---|
| 8.7 | 1 | 18.0 | 14.1 | 1.6 |
| 7.4 | 2 | 18.5 | 17.8 | 2.1 |
| 5.0 | 4 | 17.0 | 24.7 | 4.7 |
| 2.4 | 6 | 17.5 | 31.2 | 10.4 |

The above data indicate that at a boric acid concentration of about 4 weight percent in the pellet, a satisfactory strength at 1100° F. (593° C.) is obtained.

EXAMPLE III

Particulate batch of the aforementioned composition was pelletized employing different quantities of sodium hydroxide in the aqueous pelletizing solution. Results were as follows, the amount of water in the wet pellets ranging from about 16.8 to about 21.7 weight percent.

| NaOH in Pellet, Weight % | 0 | 1.5 | 3.5 | 6.1 | 10.8 |
|---|---|---|---|---|---|
| Pellet Wet Strength, # | 2.5 | 2.4 | 2.1 | 2.2 | 2.8 |
| Pellet Dried Strength, #, @ 220° F. | 12.0 | 18.3 | 49.3 | 75.7 | 158.7 |
| Pellet Strength, #, @ 1100° F. | 0 | 0.7 | 2.2 | 16.3 | 187.8 |

The above data indicate that at a sodium hydroxide content of about 4.1 weight percent, the pellets attain the desired strength at 1100° F. (593° C.).

All of the above data indicate that contrary to the prior art, even if colemanite is used as the single source of $B_2O_3$, when employing one of the aforementioned additives, temperatures above 770° F. (410° C.) can be employed during the drying step without disintegration of the pellets and their return to the powdery state.

It will be evident from the foregoing that various modifications can be made to the method of this invention. Such, however, are considered as being within the scope of the invention.

I claim:

1. A method of processing glass batch which comprises:
   (a) contacting particulate glass batch comprising uncalcined colemanite with an aqueous solution containing an additive selected from the group consisting of sodium carbonate, boric acid and sodium hydroxide and pelletizing said batch to produce wet pellets having said additive incorporated therein in an amount effective to present the disintegration of said pellets at 1100° F. (593° C.); and,
   (b) drying the wet pellets at a temperature above 770° F. (410° C.).

2. The method of claim 1 in which the amount of additive is sufficient to impart to the pellets a hot strength of about 4 pounds at about 1100° F. (593° C.).

3. The method of claim 1 in which the additive is sodium carbonate.

4. The method of claim 1 in which the additive is sodium hydroxide.

5. The method of claim 1 in which the additive is boric acid.

6. The method of claim 3 in which the additive is incorporated into said batch in an amount sufficient to impart to said pellets a strength of 4 pounds at 1100° F. (593° C.).

7. The method of claim 6 in which said sodium carbonate is incorporated into said dry pellet in an amount of about 2.5 weight percent.

8. The method of claim 6 in which said boric acid is incorporated into said dry pellet in an amount of about 4 weight percent.

9. The method of claim 6 in which said sodium hydroxide is incorporated into said dry pellet in an amount of about 4.1 weight percent.

* * * * *